United States Patent
Yanone et al.

(10) Patent No.: US 10,112,147 B2
(45) Date of Patent: Oct. 30, 2018

(54) WATER COLLECTION HEADER, MEMBRANE MODULE UNIT, AND WATER TREATMENT METHOD

(71) Applicant: Mitsubishi Chemical Corporation, Chiyoda-ku (JP)

(72) Inventors: Katsuyuki Yanone, Tokyo (JP); Makoto Ideguchi, Tokyo (JP); Tetsuya Ooshiro, Tokyo (JP); Shinya Sueyoshi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/997,739

(22) Filed: Jun. 5, 2018

(65) Prior Publication Data

US 2018/0280885 A1    Oct. 4, 2018

Related U.S. Application Data

(63) Continuation of application No. PCT/JP2017/001356, filed on Jan. 17, 2017.

(51) Int. Cl.
*B01D 63/04*    (2006.01)
*C02F 1/44*     (2006.01)
(Continued)

(52) U.S. Cl.
CPC .......... *B01D 63/046* (2013.01); *B01D 61/18* (2013.01); *B01D 61/20* (2013.01); *B01D 63/021* (2013.01); *B01D 2313/21* (2013.01); *C02F 1/44* (2013.01)

(58) Field of Classification Search
None
See application file for complete search history.

(56) References Cited

U.S. PATENT DOCUMENTS

| 2005/0218063 A1 | 10/2005 | Okazaki et al. |
| 2012/0074053 A1 | 3/2012 | Collignon et al. |
| 2013/0118966 A1 | 5/2013 | Furuno et al. |

FOREIGN PATENT DOCUMENTS

| JP | 10-180050 | 7/1998 |
| JP | 2002-336658 | 11/2002 |

(Continued)

OTHER PUBLICATIONS

International Search Report dated Mar. 21, 2017 in PCT/JP2017/001356 (with English translation).

(Continued)

*Primary Examiner* — Krishnan S Menon
(74) *Attorney, Agent, or Firm* — Oblon, McClelland, Maier & Neustadt, L.L.P.

(57) ABSTRACT

Provided is a water collection header (5) for collecting and extracting filtrate from a plurality of membrane modules (4), comprising: a plurality of cylinder portions (6) each including a cylinder body (61) formed in a cylindrical shape in which at least one end portion is opened and formed such that the end portions are sequentially connected to each other in a water-tight state, wherein at least one cylinder portion (6) of the plurality of cylinder portions (6) includes a connection portion (62) connected to the membrane module (4) so that the filtrate flows from the membrane module (4), and wherein at least one cylinder portion (6) of the plurality of cylinder portions (6) includes a water intake portion (63) capable of discharging the filtrate inside the cylinder body (61) to the outside, which is easily assembled.

11 Claims, 9 Drawing Sheets

(51) Int. Cl.
*B01D 61/18* (2006.01)
*B01D 61/20* (2006.01)
*B01D 63/02* (2006.01)

(56) References Cited

FOREIGN PATENT DOCUMENTS

| | | |
|---|---|---|
| JP | 2002-346343 | 12/2002 |
| JP | 2003-334429 | 11/2003 |
| JP | 2006-082034 | 3/2006 |
| WO | 03/066201 A1 | 8/2003 |

OTHER PUBLICATIONS

Notification of Reasons for Refusal dated Dec. 22, 2017, in Japanese Patent Application No. 2017-505877 (with English translation).

WATER COLLECTION HEADER, MEMBRANE MODULE UNIT, AND WATER TREATMENT METHOD

This application is a continuation application of International Application No. PCT/JP2017/001356, filed on Jan. 17, 2017, which claims the benefit of priority right based on Japanese Patent Application No. 2016-010087 filed in Japan on Jan. 21, 2016, the content of which are hereby incorporated by reference.

TECHNICAL FIELD

The present invention relates to a water collection header, a membrane module unit, and a water treatment method.

BACKGROUND ART

In water treatment such as water purification treatment and drainage water treatment, various methods have been examined for solid-liquid separation of treatment target water by using a membrane module having a separation membrane such as a microfiltration membrane or an ultrafiltration membrane. When the treatment target water is filtered by using the separation membrane, treated water with high water quality can be obtained. As a method for solid-liquid separation of the treatment target water, specifically, there is known a method of performing solid-liquid separation by a large number of hollow fiber membrane modules each obtained by resin-fixing a sheet-like hollow fiber membrane to a housing. Further, there is also known a method of collecting and extracting filtrate by water-tightly connecting a large number of membrane elements to a cylindrical water collection header provided with holes for connecting membrane elements.

Patent Literature 1 discloses a water collection header configured as a hollow pipe provided with a plurality of connection ports to which a water collection pipe of a membrane module is connected. In the water collection header, a plurality of holes are opened in one hollow pipe and a sleeve pipe is attached to each hole to form the connection port. For that reason, a plurality of connection ports each having a sleeve pipe provided in an elongated hollow pipe are formed in response to the number of the membrane modules.

Patent Literature 2 discloses a water collection header including a water collection member and a membrane module connection member provided with a hole for connection to a membrane module. In the water collection header, a dimension change absorption portion is provided between the membrane module connection member and the water collection member. In the water collection header, the elongated membrane module connection member is provided with a plurality of holes corresponding to the number of the membrane modules.

CITATION LIST

Patent Literature

Patent Literature 1: JP 2002-336658 A
Patent Literature 2: JP 2002-346343 A

SUMMARY OF THE INVENTION

Problem to be Solved by the Invention

However, in the above-described water collection header, it is necessary to provide the same number of holes in accordance with the number of the membrane modules connected to the elongated member. For that reason, since the number of the connected membrane modules increases, there is a need to provide more holes in a further elongated member. As a result, since the number of steps of manufacturing the water collection header increases, the assembly becomes complicated.

The invention has been made to solve the above-described problems and an object of the invention is to provide a water collection header and a membrane module unit which are easily assembled and a water treatment method which uses the same.

Means for Solving Problem

The invention has the following configuration.
[1] A water collection header for collecting and extracting filtrate from a plurality of membrane modules, including: a plurality of cylinder portions each including a cylinder body formed in a cylindrical shape in which at least one end portion is opened and formed such that the end portions are sequentially connected to each other in a water-tight state, in which at least one cylinder portion of the plurality of cylinder portions includes a connection portion connected to the membrane module so that the filtrate flows from the membrane module, and in which at least one cylinder portion of the plurality of cylinder portions includes a water intake portion capable of discharging the filtrate inside the cylinder body to the outside.
[2] The water collection header according to [1], in which an outer peripheral surface of a sliding area of the end portion of the cylinder body slides on an inner peripheral surface of a sliding area of the end portion of another adjacent cylinder body so that the cylinder body is connected to another adjacent cylinder body.
[3] The water collection header according to [2], in which at least one penetration hole is formed in the sliding area of the cylinder body having the outer peripheral surface of the end portion sliding on the inner peripheral surface of the end portion of another adjacent cylinder body, and in which the penetration hole communicates with the connection portion of the another adjacent cylinder body.
[4] The water collection header according to [2] or [3], in which a positioning mechanism is provided in the inner peripheral surface of the cylinder body having the inner peripheral surface of the end portion sliding on the outer peripheral surface of the end portion of another adjacent cylinder body.
[5] The water collection header according to [4], in which the positioning mechanism is a convex portion protruding inward from the inner peripheral surface.
[6] The water collection header according to any one of [2] to [5], in which a length of the sliding area in a longitudinal direction of the cylinder body is 60% or more of an inner diameter of an outermost portion of the inner peripheral surface of the cylinder body having the inner peripheral surface of the end portion sliding on the outer peripheral surface of the end portion of another adjacent cylinder body.
[7] The water collection header according to any one of [1] to [6], in which the connection portion includes a connection portion body formed in a cylindrical shape and extending from the outer peripheral surface of the cylinder body.
[8] The water collection header according to [7], in which the connection portion body has a screw structure provided with a spiral uneven portion formed in an outer peripheral surface of a front end portion opposite to a connection side to the cylinder body of the connection portion body.

[9] The water collection header according to [7] or [8], in which the connection portion body includes a reinforcement portion formed at the connection side to the cylinder body of the connection portion body to connect the outer peripheral surface of the connection portion body to the outer peripheral surface of the cylinder body.

[10] The water collection header according to [9], in which the reinforcement portion of the connection portion body located in the sliding area is disposed in an entire outer periphery of the cylinder body in the circumferential direction along the outer periphery.

[11] The water collection header according to any one of [1] to [10], in which the water collection header is a resin molded member formed of a resin material.

[12] A membrane module unit includes: the water collection header according to any one of [1] to [11]; a membrane module connected to the connection portion; and a frame portion equipped with the water collection header and the membrane module.

[13] A water treatment method using the membrane module unit according to [12].

Effect of the Invention

According to the invention, it is possible to provide the water collection header which is easily assembled.

Further, according to the invention, it is possible to provide the membrane module unit using the water collection header which is easily assembled and the water treatment method using the same.

MODE(S) FOR CARRYING OUT THE INVENTION

<Water Collection Header and Membrane Module Unit>

First Embodiment

Hereinafter, a membrane module unit 1 of a first embodiment of the invention will be described in detail with reference to the drawings.

Figure 1:
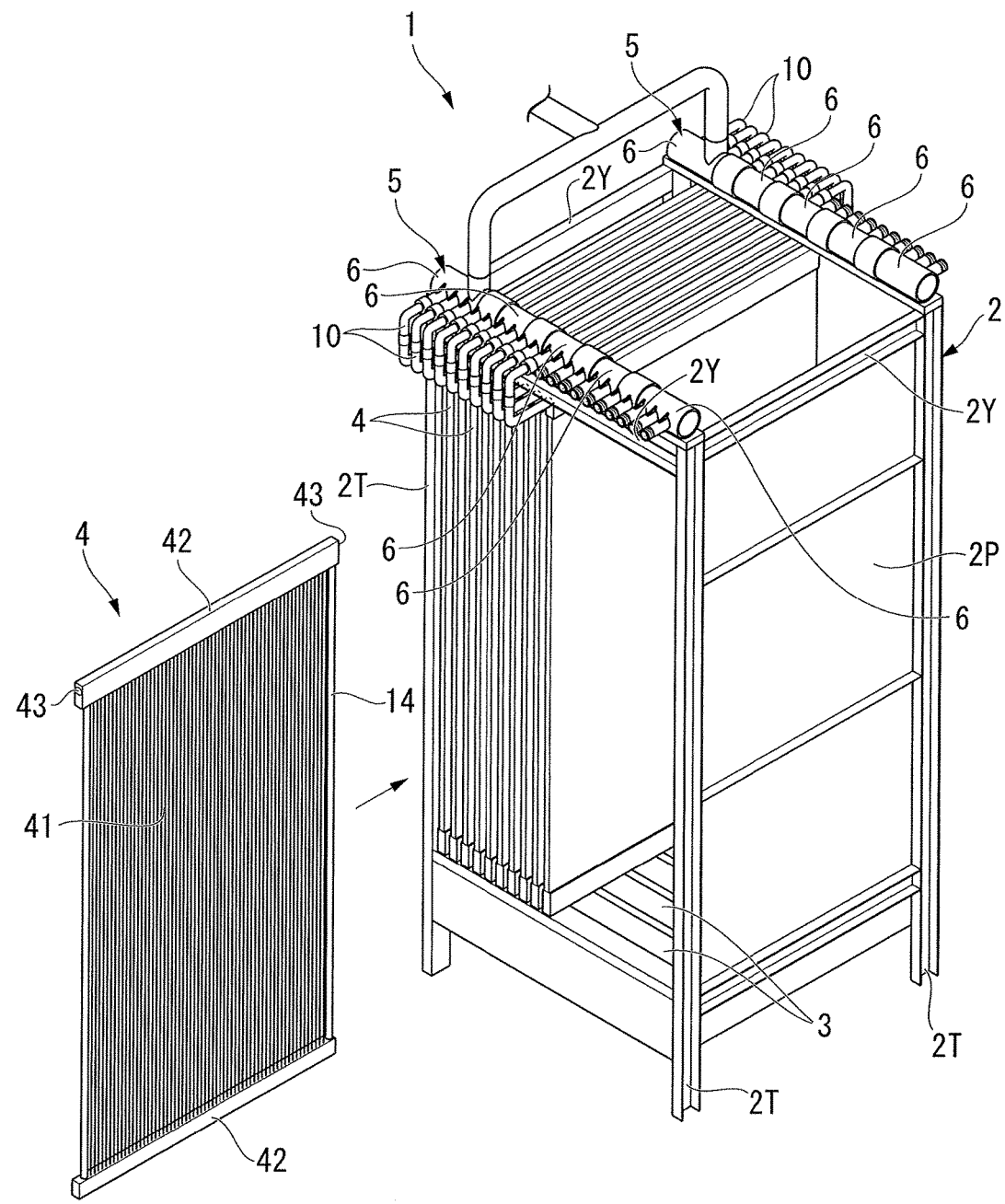
FIG. 1 is a perspective view illustrating a membrane module unit of the invention.

The membrane module unit 1 is immersed in a tank storing treatment target water to filter the treatment target water so that sludge and treated water corresponding to filtrate are separated into a solid and a liquid. The membrane module unit 1 of the embodiment includes, as illustrated in FIG. 1, a frame portion 2, a diffusing pipe 3, a membrane module 4, a water collection header 5, and a merging pipe 10.

The frame portion 2 can be equipped with components of the membrane module unit 1. The frame portion 2 is equipped with the diffusing pipe 3, the membrane module 4, and the water collection header 5. The frame portion 2 of the embodiment includes a plurality of (in the embodiment, four) vertical frames 2T formed of a channel material. The upper and lower portions of the vertical frames 2T are connected to each other by a horizontal frame 2Y while being separated from each other. Accordingly, a frame-shaped skeleton is formed in the frame portion 2. In the frame portion 2, a surface surrounded by the vertical frame 2T and the horizontal frame 2Y is covered by a plate material 2P. Additionally, a part of the plate material 2P is not illustrated in FIG. 1.

The diffusing pipe 3 is fixed to the frame portion 2 at a position lower than the membrane module 4. The diffusing pipe 3 is fixed to the horizontal frame 2Y disposed at a lower portion within a range surrounded by the vertical frame 2T. The diffusing pipe 3 is provided with a plurality of diffusing holes (not illustrated) for discharging oxygen. Oxygen is supplied to the diffusing pipe 3 by a blower (not illustrated).

The membrane module 4 includes a hollow fiber membrane sheet 41 in which a plurality of hollow fiber membranes are formed as sheets and a housing 42 which supports both end portions of the hollow fiber membrane sheet 41. A plurality of the membrane modules 4 are disposed inside the frame portion 2. The membrane module 4 is disposed inside the frame portion 2 so that the longitudinal direction of the hollow fiber membrane sheet 41 becomes parallel to the extension direction of the vertical frame 2T. The plurality of membrane modules 4 are disposed so that surfaces formed by the hollow fiber membrane sheets 41 face each other. The membrane module 4 is fixed to the frame portion 2 through the housing 42 at both end portions. In a state where the membrane module 4 is fixed to the frame portion 2, the housing 42 disposed at the upper portion is provided with a water intake port 43 for extracting drainage inside the hollow fiber membrane to the outside.

Additionally, the upper portion of the embodiment indicates an upper portion in the up and down direction (the vertical direction) in which the vertical frame 2T extends. Further, the lower portion indicates a lower portion in the up and down direction (the vertical direction) in which the vertical frame 2T extends.

Figure 2:
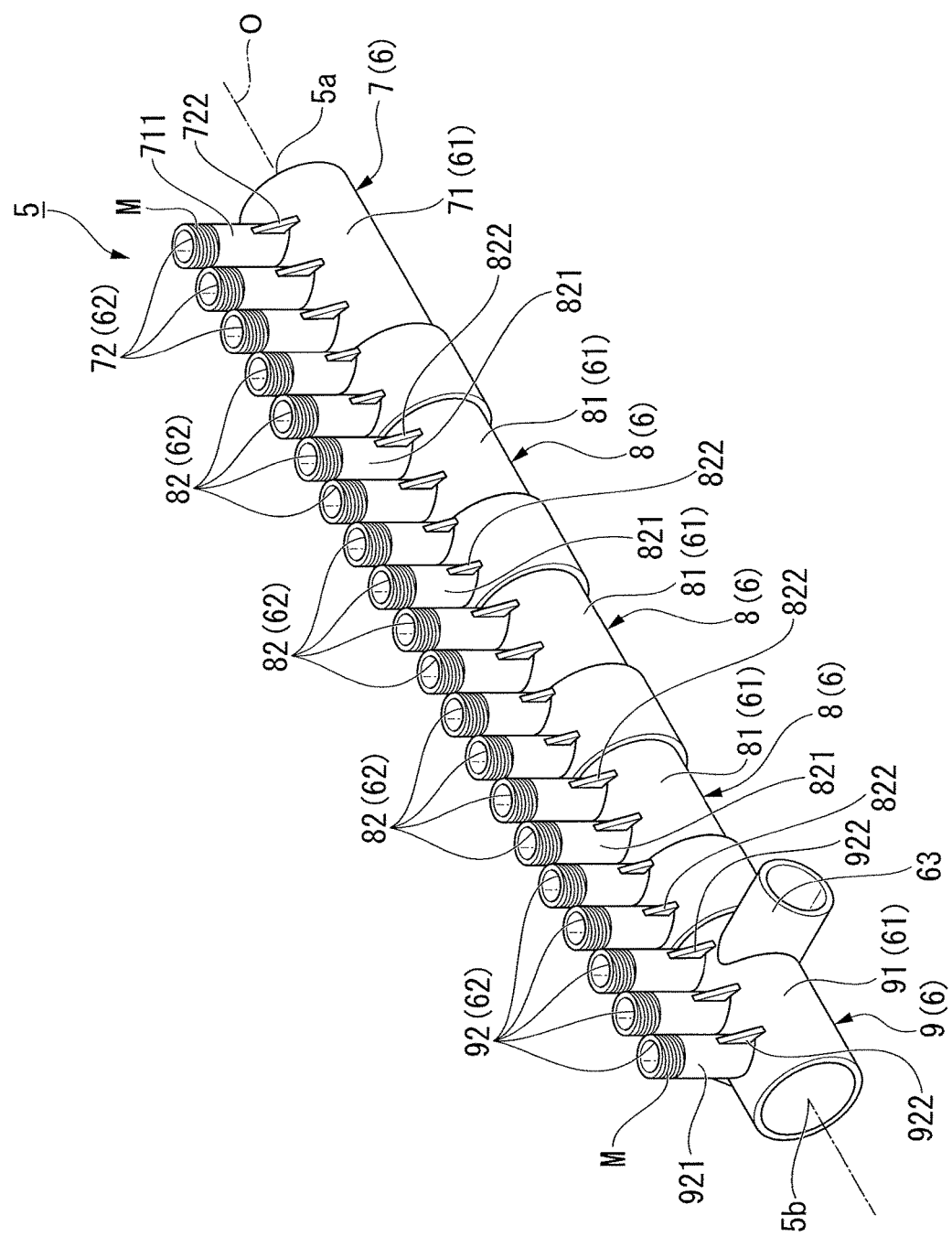
FIG. 2 is a perspective view illustrating a water collection header of a first embodiment of the invention.
Figure 3:
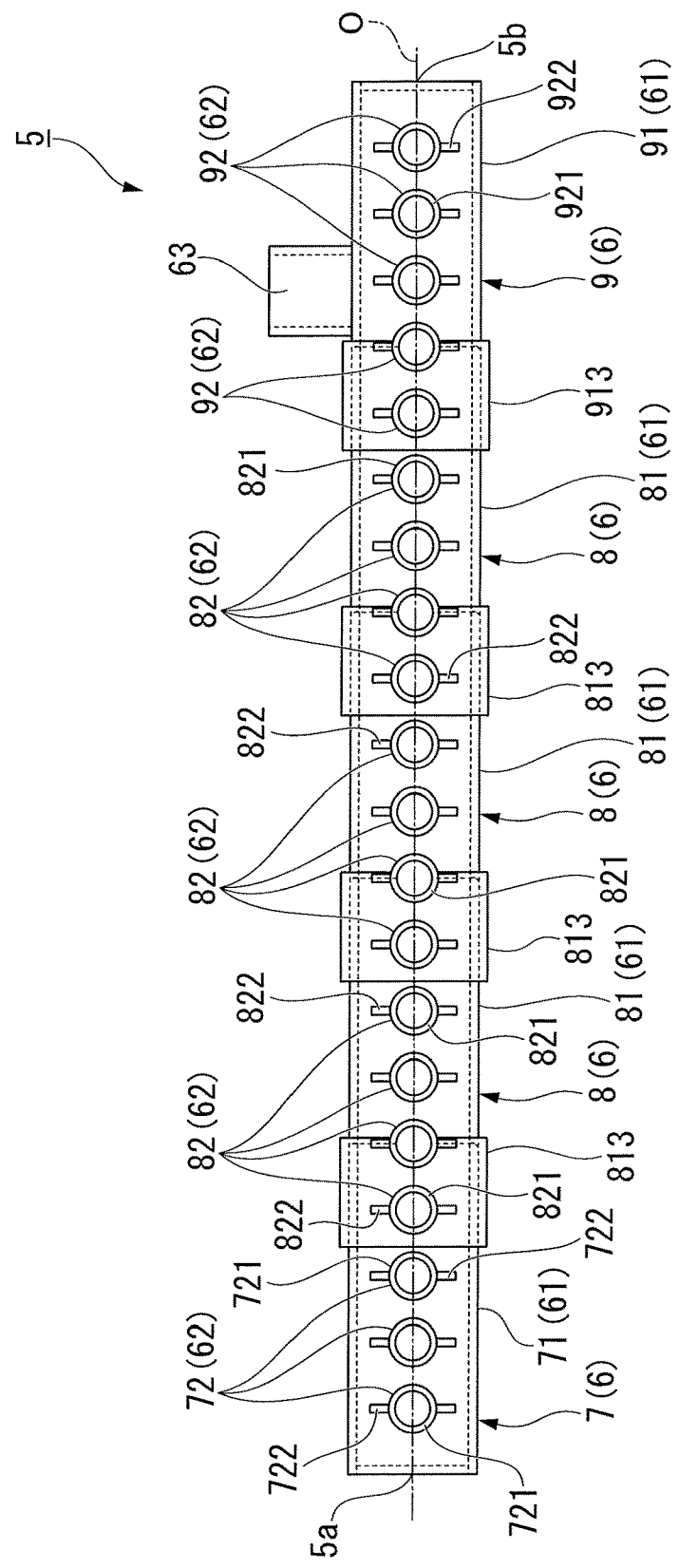
FIG. 3 is a schematic diagram illustrating the water collection header of the first embodiment of the invention.

The water collection header 5 is used to collect the filtrate from the membrane modules 4 and extract the filtrate to the outside of the membrane module unit 1. The water collection header 5 is disposed on the upper portion of the frame portion 2. The water collection header 5 is fixed to the horizontal frame 2Y at the upper portion. The water collection header 5 is connected to the membrane module 4 through the merging pipe 10 to be described later. The water collection header 5 includes a plurality of cylinder portions 6. The water collection header 5 of the embodiment is configured by connecting the cylinder portions 6 as illustrated in FIGS. 2 and 3.

The cylinder portion 6 includes a cylinder body 61 which is formed in a cylindrical shape in which at least one end portion is opened. The end portions of the cylinder portions 6 are sequentially connected to each other in a water-tight state. The cylinder portions 6 are connected to each other while their center axes O are coaxially disposed. At least one cylinder portion 6 among the cylinder portions 6 includes a connection portion 62. At least one cylinder portion 6 among the cylinder portions 6 includes a water intake portion 63.

Specifically, the water collection header 5 of the first embodiment includes one first end cylinder portion 7, a plurality of intermediate cylinder portions 8, and one second end cylinder portion 9 as the cylinder portion 6.

Figure 4:
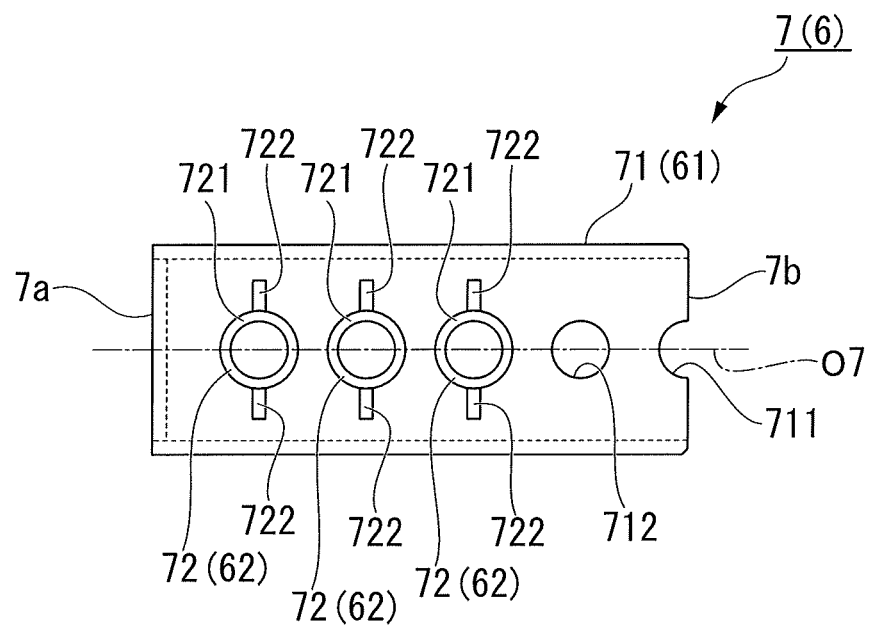
FIG. 4 is a schematic diagram illustrating a first end cylinder body of the first embodiment of the invention.
Figure 5:
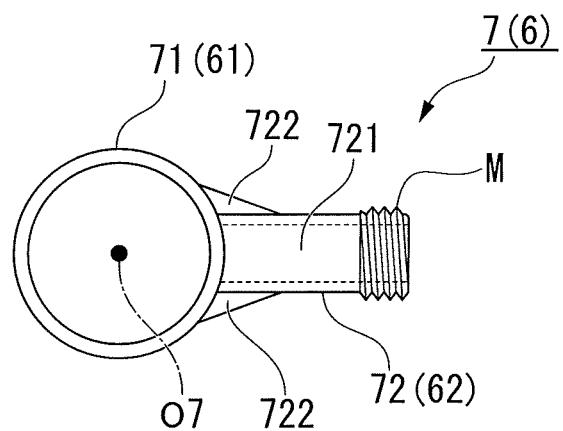
FIG. 5 is a side view illustrating the first end cylinder body of the first embodiment of the invention as viewed from an extension direction of a first center axis.

The first end cylinder portion 7 constitutes a first end portion 5a of the water collection header 5 which is one end portion of the water collection header 5. The first end cylinder portion 7 blocks the first end portion 5a of the water collection header 5. The first end cylinder portion 7 of the embodiment is formed of a resin material. The first end cylinder portion 7 is, for example, a pipe formed of PVC. The first end cylinder portion 7 includes, as illustrated in FIGS. 4 and 5, a first end cylinder body 71 (a cylinder body 61) and a plurality of first end connection portions 72 (connection portions 62). The first end cylinder portion 7 is not provided with the water intake portion 63.

The first end cylinder body 71 is formed in a cylindrical shape about the first center axis O7. The first end cylinder body 71 is formed in a bottomed cylindrical shape in which a first end portion 7a corresponding to one end portion of the first end cylinder body 71 is blocked and a second end portion 7b corresponding to the other end portion thereof is opened. The first end cylinder body 71 is formed with a constant outer diameter. In the first end cylinder body 71, an outer peripheral surface of the second end portion 7b is connected to slide on an inner peripheral surface of a first end portion 8a of an intermediate cylinder body 81 which is another adjacent cylinder body 61. An end surface of the opened second end portion 7b is provided with a first concave portion 711 which is formed in a semi-circular shape and is recessed toward the first end portion 7a. An outer peripheral surface of the first end cylinder body 71 is provided with a first penetration hole 712. The first penetration hole 712 is formed near the first end portion 7a in relation to the first concave portion 711. That is, the first penetration hole 712 is formed to be separated from the first concave portion 711 in the extension direction of the first center axis O7.

The first end connection portion 72 is connected to the housing 42 of the membrane module 4 through the merging pipe 10 so that the filtrate flows from the membrane module 4 to the first end cylinder body 71. The first end connection portions 72 are formed at the side of the first end portion 7a in relation to the first penetration hole 712. The first end connection portions 72 are arranged in series in the extension direction of the first center axis O7. The first end connection portion 72 of the embodiment is provided at three positions at the same interval between the first concave portion 711 and the first penetration hole 712. The first end connection portion 72 is integrally formed with the first end cylinder body 71. The first end connection portion 72 includes a first end connection portion body 721 (a connection portion body) and a first end reinforcement portion 722 (a reinforcement portion).

The first end connection portion body 721 is formed in a cylindrical shape and extends from the outer peripheral surface of the first end cylinder body 71.

The first end connection portion body 721 communicates with the first end cylinder body 71 at the inside and the outside thereof. The first end connection portion body 721 of the embodiment extends in a direction perpendicular to the first center axis O7 from the outer peripheral surface of the first end cylinder body 71. The first end connection portion body 721 is formed in a cylindrical shape. The first end connection portion body 721 has a screw structure M provided with a spiral uneven portion formed at the outer peripheral surface of the front end portion of the first end connection portion body 721 opposite to the connection side to the first end cylinder body 71. Specifically, as the screw structure M, a spiral groove is formed in the outer peripheral surface of the first end connection portion body 721 in a range from the front end portion to a predetermined area. In addition, the first end connection portion body 721 may include a sleeve portion having a concave structure and protruding inward from the side surface of the hollow pipe, but as in the embodiment, the first end connection portion body desirably includes the first end connection portion body 721 which is a convex structure protruding outward from the side surface of the hollow pipe.

The first end reinforcement portion 722 connects the outer peripheral surface of the first end connection portion body 721 to the outer peripheral surface of the first end cylinder body 71 at the connection side to the first end cylinder body 71 of the first end connection portion body 721. The first end reinforcement portion 722 of the embodiment is a triangular rib. A pair of the first end reinforcement portions 722 is symmetrically disposed with the first end connection portion body 721 interposed therebetween.

Figure 6:
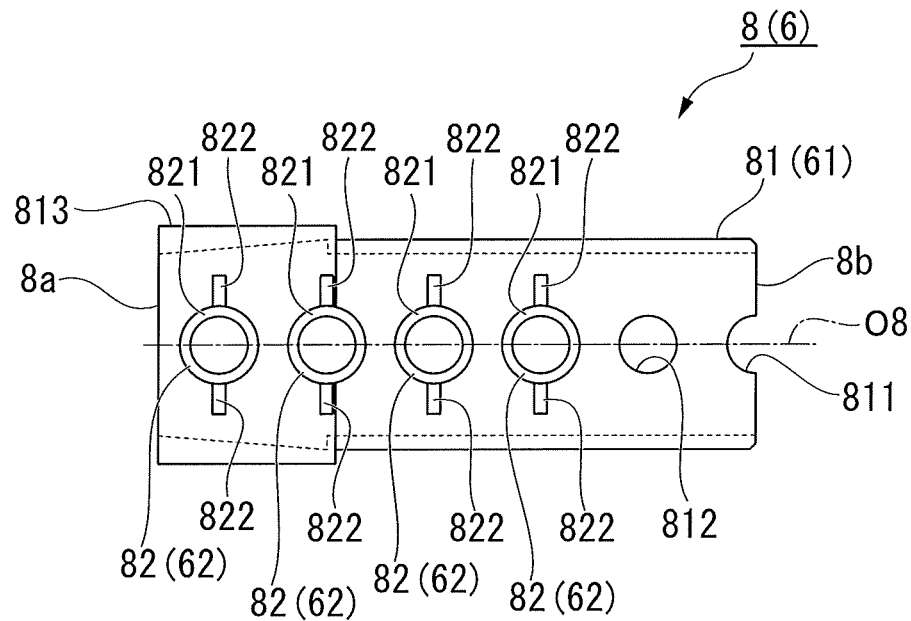
FIG. 6 is a schematic diagram illustrating an intermediate cylinder body of the first embodiment of the invention.
Figure 7:
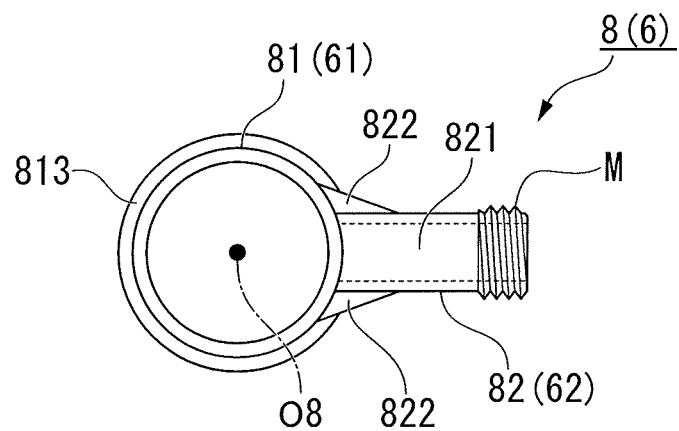
FIG. 7 is a side view illustrating the intermediate cylinder body of the first embodiment of the invention as viewed from an extension direction of an intermediate center axis.

The intermediate cylinder portion 8 constitutes a center portion of the water collection header 5. The intermediate cylinder portion 8 of the embodiment is formed by molding a resin material similarly to the first end cylinder portion 7. The intermediate cylinder portion 8 is, for example, a pipe formed of PVC. In the embodiment, three intermediate cylinder portions 8 are provided. The intermediate cylinder portion 8 includes, as illustrated in FIGS. 6 and 7, the intermediate cylinder body 81 (the cylinder body 61) and an intermediate connection portions 82 (the connection portions 62).

The intermediate cylinder body 81 is formed in a cylindrical shape about the intermediate center axis O8. The intermediate cylinder body 81 is formed in a cylindrical shape in which both end portions are opened. The intermediate cylinder body 81 includes an intermediate expanded area 813 which is formed at the side of the first end portion 8a corresponding to one end portion of the intermediate cylinder body 81 to have an outer diameter larger than that of a second end portion 8b corresponding to the other end portion. The intermediate expanded area 813 is formed to a predetermined area from the first end portion 8a of the intermediate cylinder body 81. An inner diameter of the intermediate expanded area 813 is formed to be larger than the inner diameter of the second end portion 8b of the intermediate cylinder body 81. An inner peripheral surface of the intermediate expanded area 813 is inclined to approach the intermediate center axis O8 as it goes from the second end portion 8b toward the first end portion 8a. Since the inner peripheral surface is inclined in a tapered shape, the inner diameter of the first end portion 8a of the intermediate cylinder body 81 is formed to be slightly smaller than the outer diameter of the second end portion 8b. Since the inner peripheral surface of the intermediate expanded area 813 of the intermediate cylinder body 81 adheres to the outer peripheral surface of the second end portion 8b of another adjacent intermediate cylinder body 81 or the outer peripheral surface of the first end portion 7a of the first end cylinder body 71 in a sliding state, the intermediate cylinder portions 8 or the intermediate cylinder portion 8 and the first end cylinder portion 7 are water-tightly connected to each other.

An end surface of the second end portion 8b having a small outer diameter in the intermediate cylinder body 81 is provided with an intermediate concave portion 811 which is formed in a semi-circular shape and is recessed toward the first end portion 8a. An outer peripheral surface of the intermediate cylinder body 81 is provided with an intermediate penetration hole 812. The intermediate penetration hole 812 is formed near the first end portion 8a in relation to the intermediate concave portion 811. That is, the intermediate penetration holes 812 are formed in the intermediate concave portion 811 to be arranged in the extension direction of the intermediate center axis O8 at the same interval between the first concave portion 711 and the first penetration hole 712.

The intermediate connection portion 82 is connected to the housing 42 of the membrane module 4 through the merging pipe 10 so that the filtrate flows from the membrane module 4 to the intermediate cylinder body 81. The intermediate connection portion 82 of the embodiment is formed in the same shape as that of the first end connection portion 72. The intermediate connection portions 82 are formed at the side of the first end portion 8a in relation to the intermediate penetration hole 812. The intermediate connection portions 82 are arranged in series in the extension direction of the intermediate center axis O8. Four intermediate connection portions 82 of the embodiment are provided at the same interval similarly to the first end connection portion 72. The intermediate connection portion 82 is integrally formed with the intermediate cylinder body 81. The intermediate connection portion 82 includes an intermediate connection portion body 821 (a connection portion body) and an intermediate reinforcement portion 822 (a reinforcement portion).

The intermediate connection portion body 821 is formed in a cylindrical shape and extends from the outer peripheral surface of the intermediate cylinder body 81. The intermediate connection portion body 821 communicates with the intermediate cylinder body 81 at the inside and the outside thereof. The intermediate connection portion body 821 of the embodiment extends in a direction perpendicular to the intermediate center axis O8 from the outer peripheral surface of the intermediate cylinder body 81. The intermediate connection portion body 821 is formed in a cylindrical shape. The intermediate connection portion body 821 has a screw structure M provided with a spiral uneven portion formed at the outer peripheral surface of the front end portion of the intermediate connection portion body 821 opposite to the connection side to the intermediate cylinder body 81. Specifically, as the screw structure M, a spiral groove is formed in the outer peripheral surface of the intermediate connection portion body 821 in a range from the front end portion to a predetermined area.

The intermediate reinforcement portion 822 connects the outer peripheral surface of the intermediate connection portion body 821 and the outer peripheral surface of the intermediate cylinder body 81 at the connection side to the intermediate cylinder body 81 of the intermediate connection portion body 821. The intermediate reinforcement portion 822 of the embodiment has the same shape as that of the first end reinforcement portion 722. A pair of the intermediate reinforcement portions 822 is formed symmetrically with the intermediate connection portion body 821 interposed therebetween.

The second end cylinder portion 9 constitutes a second end portion 5b which the other end portion of the water collection header 5.

Figure 8:
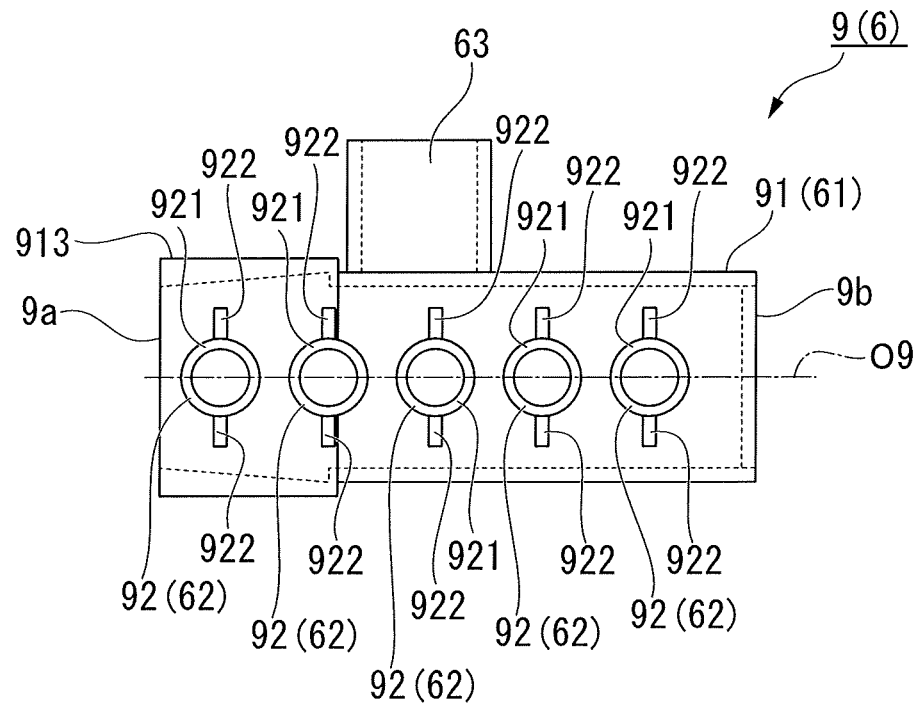
FIG. 8 is a schematic diagram illustrating a second end cylinder body of the first embodiment of the invention.
Figure 9:
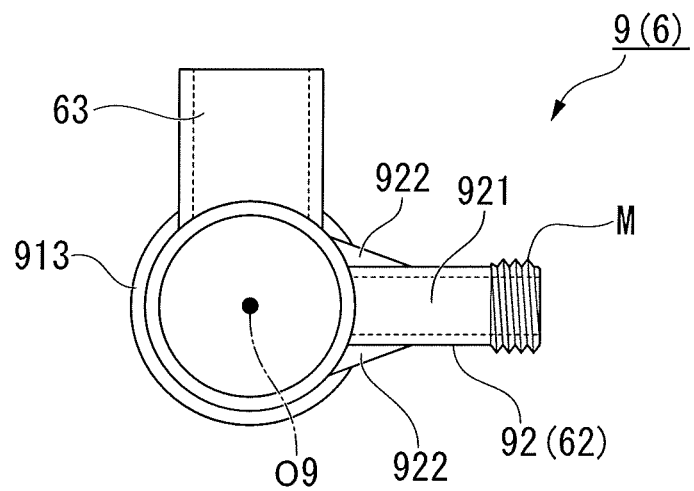
FIG. 9 is a side view illustrating the second end cylinder body of the first embodiment of the invention as viewed from an extension direction of a second center axis.

The second end cylinder portion 9 blocks the second end portion 5b of the water collection header 5. The second end cylinder portion 9 of the embodiment is formed by molding a resin material similarly to the first end cylinder portion 7 or the intermediate cylinder portion 8. The first end cylinder portion 7 is, for example, a pipe formed of PVC. The second end cylinder portion 9 includes, as illustrated in FIGS. 8 and 9, a second end cylinder body 91 (the cylinder body 61), a plurality of second end connection portions 92 (the connection portion 62), and the water intake portion 63.

The second end cylinder body 91 is formed in a cylindrical shape about the second center axis O9. The second end cylinder body 91 is formed in a bottomed cylindrical shape in which a first end portion 9a corresponding to one end portion of the second end cylinder body 91 is opened and a second end portion 9b corresponding to the other end portion is blocked. The second end cylinder body 91 includes a second enlarged area 913 formed at the side of the first end portion 9a to have an outer diameter larger than that of the second end portion 9b. The second enlarged area 913 is formed in a predetermined area from the first end portion 9a of the second end cylinder body 91 toward the second end portion 9b. An inner diameter of the second enlarged area 913 is formed to be larger than the inner diameter of the second end portion 9b of the second end cylinder body 91. An inner peripheral surface of the second enlarged area 913 is inclined to approach the second center axis O9 as it goes from the second end portion 9b toward the first end portion 9a. Since the inner peripheral surface is inclined in a tapered shape, the second end cylinder body 91 is formed so that the inner diameter of the first end portion 9a is smaller than the outer diameter of the second end portion 9b. Since an inner peripheral surface of the second enlarged area 913 of the second end cylinder body 91 adheres to the outer peripheral surface of the second end portion 8b of the intermediate cylinder body 81 in a sliding state, the intermediate cylinder portion 8 and the second end cylinder portion 9 are water-tightly connected to each other.

A second end connection portion 92 is connected to the housing 42 of the membrane module 4 through the merging pipe 10 so that the filtrate flows from the membrane module 4 to the second end cylinder body 91. The second end connection portion 92 of the embodiment is formed in the same shape as that of the first end connection portion 72 and the intermediate connection portion 82. A plurality of the second end connection portions 92 are arranged in series in the extension direction of the second center axis O9. Five second end connection portions 92 of the embodiment are provided at the same interval similarly to the first end connection portion 72 or the intermediate connection portion 82. The second end connection portion 92 includes a second end connection portion body 921 (a connection portion body) and a second end reinforcement portion 922 (a reinforcement portion).

The second end connection portion body 921 is formed in a cylindrical shape and extends from the outer peripheral surface of the second end cylinder body 91.

The second end connection portion body 921 communicates with the second end cylinder body 91 at the inside and the outside thereof. The second end connection portion body 921 of the embodiment extends in a direction perpendicular to the second center axis O9 from the outer peripheral surface of the second end cylinder body 91. The second end connection portion body 921 is formed in a cylindrical shape. The second end connection portion body 921 has a screw structure M provided with a spiral uneven portion formed at the outer peripheral surface of the front end portion of the second end connection portion body opposite to the connection side to the second end cylinder body 91. Specifically, as the screw structure M, a spiral groove is formed in the outer peripheral surface of the second end connection portion body 921 in a range from the front end portion to a predetermined area.

The second end reinforcement portion 922 connects the outer peripheral surface of the second end connection portion body 921 and the outer peripheral surface of the second end cylinder body 91 at the connection side to the second end cylinder body 91 of the second end connection portion body 921. The second end reinforcement portion 922 of the embodiment has the same shape as those of the first end reinforcement portion 722 and the intermediate reinforcement portion 822. A pair of the second end reinforcement portions 922 is symmetrically formed with the second end connection portion body 921 interposed therebetween.

The water intake portion 63 is configured to discharge the filtrate inside the cylinder portions 6 to the outside. The water intake portion 63 is connected to a suction pump (not illustrated) through a hose (not illustrated). When the suction pump of the embodiment is operated, the treatment target water inside the second end cylinder portion 9 is discharged to the outside through the water intake portion 63. Accordingly, the water intake portion 63 is configured to discharge the filtrate inside the connected cylinder portions 6 of the first end cylinder portion 7, the intermediate cylinder portion 8, and the second end cylinder portion 9 to the outside. The water intake portion 63 is formed in a cylindrical shape and extends from the outer peripheral surface of the second end cylinder body 91. The water intake portion 63 of the embodiment is provided at a position rotated by 90° about the second center axis O9 from the arrangement position of the second end connection portion 92. The water intake portion 63 is provided in the vicinity of the center of the second end cylinder body 91 in the extension direction of the second center axis O9. The water intake portion 63 extends in a direction perpendicular to the second center axis O9 from the outer peripheral surface of the second end cylinder body 91. The water intake portion 63 is formed in a cylindrical shape having a diameter lager than that of the second end connection portion body 921.

As illustrated in FIG. 1, the merging pipe 10 connects the water intake port 43 of the housing 42 of the membrane module 4 to the first end connection portion 72, the intermediate connection portion 82, and the second end connection portion 92 corresponding to the connection portion 62. The merging pipe 10 of the embodiment is a pipe which is formed in a U-shape and of which both ends are opened.

One end portion of the merging pipe 10 is separably attachable to the water intake port 43 provided in the housing 42. The merging pipe 10 is formed so that an end portion opposite to an end portion separably attachable to the water intake port 43 is attachable to and detachable from the first end connection portion body 721, the intermediate connection portion body 821, and the second end connection portion body 921. The merging pipe 10 of the embodiment is fitted to the front end portions of the first end connection portion body 721, the intermediate connection portion body 821, and the second end connection portion body 921 through a seal member such as an O-ring. The merging pipe 10 is fitted to the inner peripheral surfaces of the first end connection portion body 721, the intermediate connection portion body 821, and the second end connection portion body 921 while the outer peripheral surface slides on the inner peripheral surfaces.

As illustrated in FIGS. 2 and 3, in the water collection header 5, the first end portion 8a of the intermediate cylinder body 81 is fitted to the second end portion 7b of the first end cylinder body 71. As a result, the first end cylinder body 71 is connected to the intermediate cylinder body 81 while the outer peripheral surface of the second end portion 7b slides on the inner peripheral surface of the intermediate expanded area 813 of the intermediate cylinder body 81. Here, an area in which the cylinder body 61 slides on another adjacent cylinder body 61 will be referred to as a "sliding area". Thus, an area in which the outer peripheral surface of the second end portion 7b of the first end cylinder body 71 slides on the inner peripheral surface of the intermediate expanded area 813 of the intermediate cylinder body 81 is a sliding area of the first end cylinder body 71 and an area in which the inner peripheral surface of the intermediate expanded area 813 of the intermediate cylinder body 81 slides on the outer peripheral surface of the second end portion 7b of the first end cylinder body 71 is a sliding area of the intermediate cylinder body 81.

Accordingly, the first end cylinder portion 7 is connected to the intermediate cylinder portion 8 while the position of the first center axis O7 is aligned to the position of the intermediate center axis O8. At this time, the position of the first penetration hole 712 or the first concave portion 711 of the first end cylinder portion 7 is aligned to the position of the intermediate connection portion body 821 of the intermediate cylinder portion 8. Accordingly, the intermediate connection portion body 821 communicates with the first end cylinder portion 7 and the intermediate cylinder portion 8 at the inside and the outside thereof even when the first end cylinder portion 7 and the intermediate cylinder portion 8 overlap each other.

Additionally, at the time of causing the outer peripheral surface of the end portion of the cylinder body 61 (referred to as a cylinder body 61A in the following several paragraphs) to slide on the inner peripheral surface of another adjacent cylinder body 61 (referred to as a cylinder body 61B in the following several paragraphs), it is desirable to provide a positioning mechanism in the inner peripheral surface of the cylinder body 61B in order to align the position of the penetration hole or the concave portion of the sliding area of the cylinder body 61A to the position of the connection portion body of the sliding area of the cylinder body 61B.

The positioning mechanism may have a configuration in which a convex portion is formed in the inner peripheral surface of the cylinder body 61B to protrude inward so that the cylinder body 61A and the cylinder body 61B slide on each other in a determined sliding area. The convex portion may be provided in a part or the entirety of the inner peripheral surface. In order not to prevent the flow of the filtrate inside the cylinder body 61B, it is desirable to provide a convex portion having a height substantially corresponding to the thickness of the cylinder body 61A and a height smaller than the thickness in the entire inner peripheral surface (except for a portion provided with the penetration hole).

Further, the length of the sliding area in the longitudinal direction of the cylinder body is desirably 60 to 100%, more desirably 75 to 95%, and further desirably 85 to 90% of the inner diameter of the outermost portion of the inner peripheral surface of the cylinder body 61B (the first end portion 8a of FIG. 6 and the first end portion 9a of FIG. 8).

When the length of the sliding area in the longitudinal direction of the cylinder body is equal to or larger than the lower-limit value, the center axis hardly shakes. Meanwhile, when the length is equal or smaller than the upper-limit value, the assembly is easy.

In the intermediate cylinder portion 8 of which the first end portion 8a is connected to the first end cylinder portion 7, the second end portion 8b is connected to another intermediate cylinder portion 8. That is, the intermediate cylinder body 81 is connected to another intermediate cylinder body 81 while the outer peripheral surface of the second end portion 8b slides on the inner peripheral surface of the intermediate expanded area 813 of another intermediate cylinder body 81 (all of an area in which the outer peripheral surface of the second end portion 8b of the intermediate cylinder body 81 slides on the inner peripheral surface of the intermediate expanded area 813 of another intermediate cylinder body 81 and an area in which the inner peripheral surface of the intermediate expanded area 813 of another intermediate cylinder body 81 slides on the outer peripheral surface of the second end portion 8b of the intermediate cylinder body 81 are sliding areas). Accordingly, the intermediate cylinder portions 8 are connected to each other while the positions of the intermediate center axes O8 are aligned to each other. In this way, the intermediate cylinder portions 8 are connected. In the embodiment, three intermediate cylinder portions 8 are connected.

In the intermediate cylinder portion 8 disposed closest to the second end portion 8b among the connected intermediate cylinder portions 8, the second end portion 8b is connected to the second end cylinder portion 9. The intermediate cylinder body 81 closest to the second end portion 8b is connected to the second end cylinder body 91 while the outer peripheral surface of the second end portion 8b slides on the inner peripheral surface of the second enlarged area 913 of the second end cylinder body 91 (all of an area in which the outer peripheral surface of the second end portion 8b of the intermediate cylinder body 81 slides on the inner peripheral surface of the second enlarged area 913 of the second end cylinder body 91 and an area in which the inner peripheral surface of the second enlarged area 913 of the second end cylinder body 91 slides on the outer peripheral surface of the second end portion 8b of the intermediate cylinder body 81 are sliding areas). Accordingly, the second end cylinder portion 9 is connected to the intermediate cylinder portion 8 while the position of the second center axis O9 is aligned to the position of the intermediate center axis O8. In this way, the water collection header 5 is assembled by the cylinder portions 6.

According to the above-described water collection header 5 of the first embodiment, the first end cylinder portion 7, the intermediate cylinder portion 8, and the second end cylinder portion 9 are water-tightly connected to each other in the extension direction of the center axis O of the water collection header 5. The first end cylinder portion 7, the intermediate cylinder portion 8, and the second end cylinder portion 9 are respectively provided with the first end connection portion 72, the intermediate connection portion 82, and the second end connection portion 92 corresponding to the connection portion 62. For that reason, it is possible to obtain the water collection header 5 which is connectable to the membrane module 4 just by connecting the first end cylinder portion 7, the intermediate cylinder portion 8, and the second end cylinder portion 9 to each other in the extension direction of the center axis O. Thus, it is possible to obtain the water collection header 5 just by assembling a small number of members in the extension direction of the center axis O.

Further, since the first end cylinder portion 7, the intermediate cylinder portion 8, and the second end cylinder portion 9 are formed by molding a resin material, it is possible to form the water collection header 5 by a material that is inexpensive and excellent in mass productivity. Further, since these members are formed of a resin material, it is possible to realize a decrease in weight compared to a case where a metal material is used.

Further, since the number of the intermediate cylinder portions 8 is changed along with the number of the membrane modules 4 to be connected thereto, it is possible to obtain the water collection header 5 having an arbitrary length by changing the length in the extension direction of the center axis O.

Further, the intermediate cylinder body 81 is provided with the intermediate expanded area 813. For that reason, the outer peripheral surface of the second end portion 7b of the first end cylinder portion 7 can slide on the inner peripheral surface of the first end portion 8a of the intermediate cylinder portion 8 or the outer peripheral surface of the adjacent intermediate cylinder portion 8 can slide on the inner peripheral surface thereof. Similarly, the second end cylinder body 91 is provided with the second enlarged area 913. For that reason, the outer peripheral surface of the second end portion 9b of the second end cylinder portion 9 can slide on the inner peripheral surface of the first end portion 8a of the intermediate cylinder portion 8. Thus, it is possible to improve the connection strength between the adjacent cylinder portions 6 and to easily connect the cylinder portions in a water-tight state.

Further, the inner peripheral surface of the intermediate expanded area 813 or the second enlarged area 913 is formed in a tapered shape. For that reason, it is possible to connect the adjacent first end cylinder portions 7 or the adjacent intermediate cylinder portions 8 in a partially interfering state. Thus, it is possible to further improve the connection strength between the adjacent cylinder portions 6 and to connect the cylinder portions in a water-tight state.

Further, the first end connection portion 72 which is connected to the membrane module 4 through the merging pipe 10 includes the first end connection portion body 721 which is formed in a cylindrical shape. Similarly, the intermediate connection portion 82 includes the intermediate connection portion body 821 which is formed in a cylindrical shape. The second end connection portion 92 includes the second end connection portion body 921 which is formed in a cylindrical shape. For that reason, it is possible to easily form a seal member such as an O-ring in the connection portion 62 compared to a case where a hole (a concave portion) for fitting the merging pipe 10 thereinto is just formed in the first end cylinder body 71, the intermediate cylinder body 81, and the second end cylinder body 91. Thus, the first end cylinder portion 7, the intermediate cylinder portion 8, and the second end portion 8b can be water-tightly connected to the merging pipe 10.

Further, the outer peripheral surfaces of the front end portions of the first end connection portion body 721, the intermediate connection portion body 821, and the second end connection portion body 921 are provided with a screw structure M having a spiral uneven portion. For that reason, since a member such as a lid provided with a screw structure in the inner peripheral surface is used, a fitting operation can be performed through the screw structure M. Thus, since the first end connection portion body 721, the intermediate connection portion body 821, and the second end connection portion 92 can be more strongly connected to each other compared to a case where another member is simply interposed therebetween, a separation thereof can be prevented. For that reason, even when there is the connection portion 62 which is not partially necessary to be connected to the membrane module 4, the connection portion 62 can be blocked.

Further, since the screw structure M is formed in the outer peripheral surfaces of the first end connection portion body 721, the intermediate connection portion body 821, and the second end connection portion body 921 instead of the inner peripheral surfaces thereof, it is possible to prevent a sealing property from being impaired at the time of connecting the merging pipe 10. That is, as in the embodiment, since the merging pipe 10 is fitted into the first end connection portion body 721, the intermediate connection portion body 821, and the second end connection portion body 921, it is possible to prevent an influence of the screw structure M on the connection of the merging pipe 10 with respect to the first end connection portion body 721, the intermediate connection portion body 821, and the second end connection portion body 921.

Further, since the first end reinforcement portion 722 is provided, it is possible to improve the bonding strength between the first end connection portion body 721 and the first end cylinder body 71. Similarly, since the intermediate reinforcement portion 822 and the second end reinforcement portion 922 are provided, it is possible to improve the bonding strength between the intermediate connection portion body 821 and the intermediate cylinder body 81 or the bonding strength between the second end connection portion body 921 and the second end cylinder body 91.

Second Embodiment

Hereinafter, a water collection header 5A of a second embodiment of the invention will be described in detail with reference to the drawings.

Additionally, a membrane module unit of the second embodiment of the invention can be obtained by employing the water collection header 5A instead of the water collection header 5 of the membrane module unit 1 of the first embodiment of the invention.

The same component as that of the first embodiment will be indicated by the same reference numeral as that of the first embodiment and a detailed description thereof will be omitted. The water collection header of the second embodiment is different from that of the first embodiment in the configuration of the water intake portion.

Figure 10:
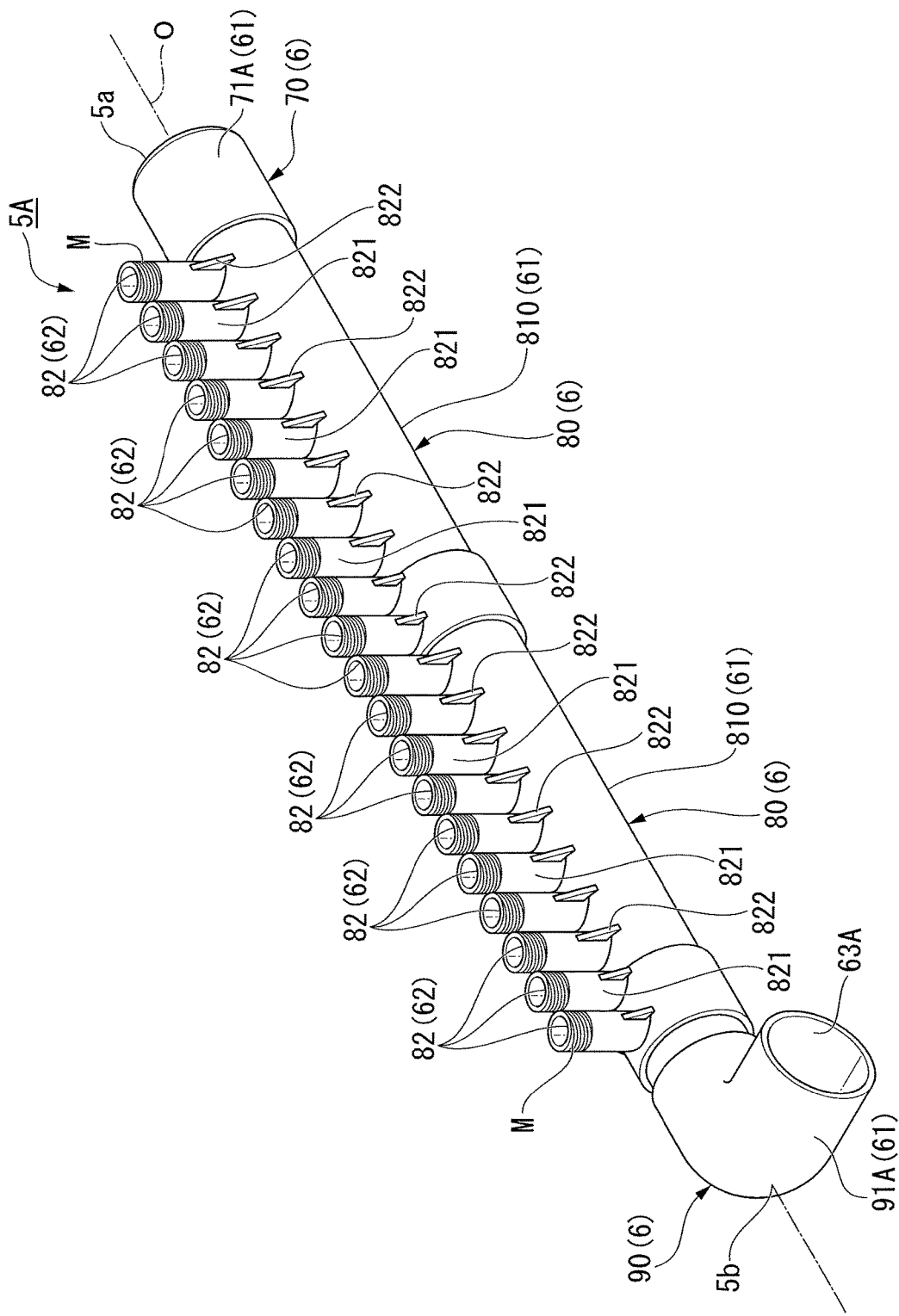
FIG. 10 is a perspective view illustrating a water collection header of a second embodiment of the invention.
Figure 11:
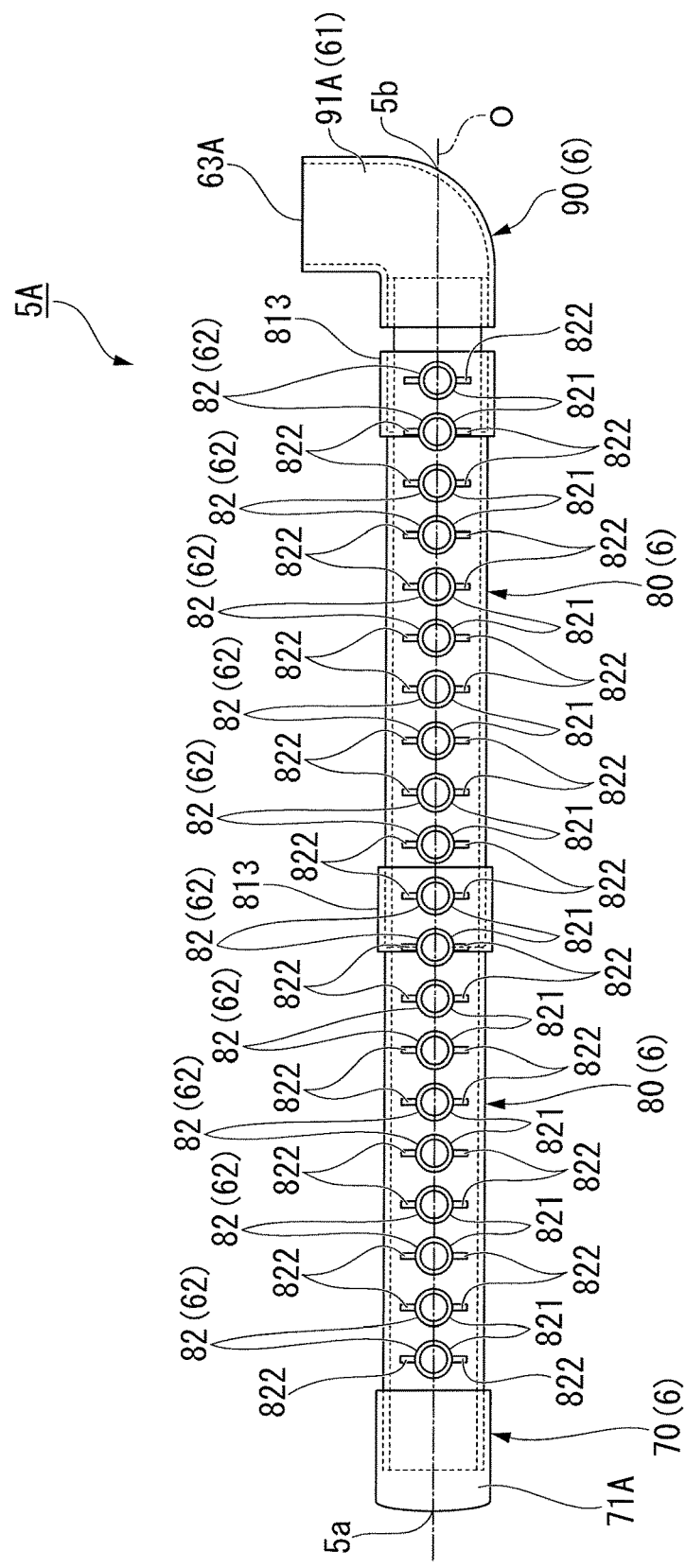
FIG. 11 is a schematic diagram illustrating the water collection header of the second embodiment of the invention.

The water collection header 5A of the second embodiment is configured by connecting a plurality of cylinder portions 6 different from those of the first embodiment as illustrated in FIGS. 10 and 11. Specifically, the water collection header 5A of the second embodiment includes a plurality of second intermediate cylinder portions 80, an end cylinder portion 70, and a water intake cylinder portion 90 as the cylinder portion 6.

The second intermediate cylinder portion 80 constitutes the center portion of the water collection header 5A. The second intermediate cylinder portion 80 is provided with the intermediate connection portion 82 which is more than that of the intermediate cylinder portion 8 of the first embodiment. The second intermediate cylinder portion 80 is formed by molding a resin material similarly to the intermediate cylinder portion 8 of the first embodiment. The second intermediate cylinder portion 80 is, for example, a pipe formed of PVC. The water collection header 5A of the second embodiment includes two second intermediate cylinder portions 80. The second intermediate cylinder portion 80 includes a second intermediate cylinder body 810 (the cylinder body 61) and the intermediate connection portions 82.

The second intermediate cylinder body 810 is formed to be longer than the intermediate cylinder body 81 of the first embodiment.

The second intermediate cylinder body 810 is formed in a cylindrical shape in which both end portions are opened. The second intermediate cylinder body 810 includes the intermediate expanded area 813 which is formed at the side of the first end portion corresponding to one end portion and the second end portion corresponding to the other end portion of the second intermediate cylinder body 810 similarly to the intermediate cylinder body 81. When the inner peripheral surface of the intermediate expanded area 813 of the second intermediate cylinder body 810 adheres to the outer peripheral surface of the first end portion of another adjacent second intermediate cylinder body 810 or the outer peripheral surface of the first end portion of the water intake cylinder portion 90 in a sliding state, the second intermediate cylinder portions 80 or the second intermediate cylinder portion 80 and the water intake cylinder portion 90 are water-tightly connected to each other.

The intermediate connection portion 82 is formed in the same shape as that of the first embodiment. The intermediate connection portion 82 of the second embodiment is formed at ten positions to be separated from each other. The intermediate connection portion 82 is integrally formed with the second intermediate cylinder body 810.

The end cylinder portion 70 constitutes the first end portion 5a which is one end portion of the water collection header 5A of the second embodiment. The end cylinder portion 70 blocks the first end portion 5a of the water collection header 5. The end cylinder portion 70 of the embodiment is formed by molding a resin material similarly to the second intermediate cylinder portion 80. The end cylinder portion 70 is, for example, a pipe formed of PVC. The end cylinder portion 70 does not include the connection portion 62 or the water intake portion 63, but only includes an end cylinder body 71A corresponding to the cylinder body 61.

The end cylinder body 71A is formed in a bottomed cylindrical shape. The end cylinder body 71A is formed to have an outer diameter which is the same as that of the second end portion of the second intermediate cylinder body 810. The first end portion of the second intermediate cylinder body 810 is fitted to the opened end portion of the end cylinder body 71A. Accordingly, since the inner peripheral surface of the end cylinder body 71A adheres to the outer peripheral surface of the adjacent second intermediate cylinder body 810 in a sliding state, the second intermediate cylinder portion 80 and the end cylinder portion 70 are water-tightly connected to each other.

The water intake cylinder portion 90 constitutes the second end portion 5b which is the other end portion of the water collection header 5 of the second embodiment. The water intake cylinder portion 90 of the embodiment is formed by molding a resin material similarly to the second intermediate cylinder portion 80 and the end cylinder portion 70. The water intake cylinder portion 90 is, for example, a pipe formed of PVC. The water intake cylinder portion 90 does not include the connection portion 62, but includes a water intake cylinder body 91A and a water intake portion 63A.

The water intake cylinder body 91A of the embodiment is integrally formed with the water intake portion 63A. The water intake cylinder body 91A is an L-shaped tubular joint (elbow). The water intake cylinder body 91A is formed to have an outer diameter which is the same as that of the second end portion of the second intermediate cylinder portion 80. The water intake cylinder body 91A is connected to the second intermediate cylinder portion 80 through a pipe of which an outer peripheral surface is slidable on the inner peripheral surface of the water intake cylinder body 91A or the second intermediate cylinder portion 80. Accordingly, the water intake cylinder body 91A is water-tightly connected to the adjacent second intermediate cylinder body 810 through a pipe. Further, the water intake cylinder portion 90 is connected to a suction pump (not illustrated) through a hose (not illustrated) while an end portion not connected to the second intermediate cylinder portion 80 is opened. That is, the water intake portion 63A of the second embodiment is constituted by the end portion which is not connected to the second intermediate cylinder portion 80 of the water intake cylinder body 91A.

Also in the water collection header 5A of the second embodiment, it is possible to obtain the same operational effect as that of the water collection header 5 of the first embodiment.

Other Embodiments

Although the examples of the embodiments of the invention have been described in detail with reference to the drawings, the respective configurations and combinations thereof in the embodiments are merely examples and additions, omission, substitution, and other modifications of the configurations can be made within the scope not deviating from the gist of the invention. Further, the invention is not limited to the embodiments, but is limited only to the claims.

In the first embodiment and the second embodiment, the reinforcement portions (the first end reinforcement portion 711, the intermediate reinforcement portion 822, and the second end reinforcement portion 922) are indicated as a pair of triangular ribs symmetrically disposed with the connection portion body interposed therebetween so that the outer peripheral surface of the connection portion body is connected to the outer peripheral surface of the cylinder body at the connection side to the cylinder body of the connection portion body, but the shape of the reinforcement portion is not limited to such a shape.

Figure 12:
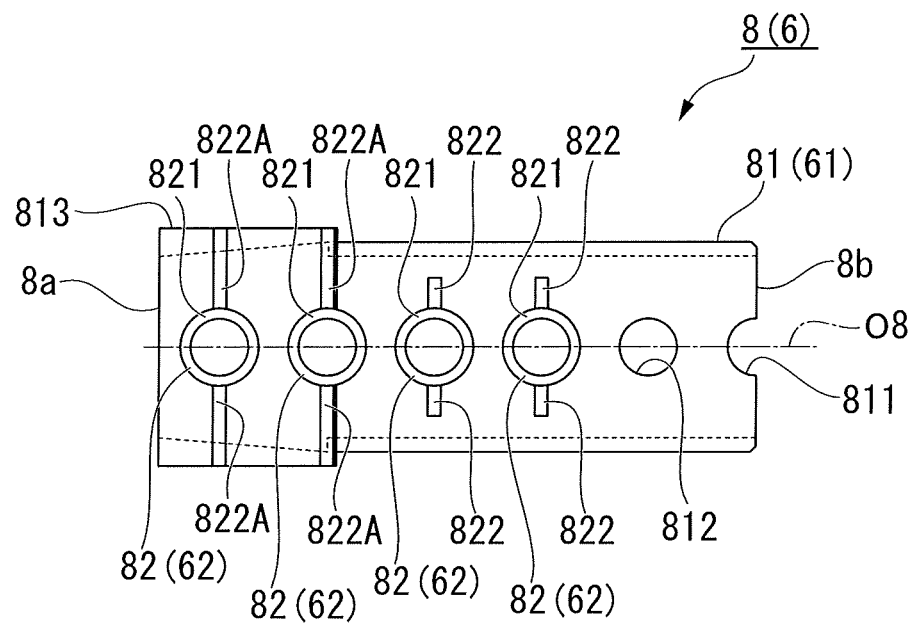
FIG. 12 is a schematic diagram illustrating an intermediate cylinder body of another embodiment of the invention.
Figure 13:
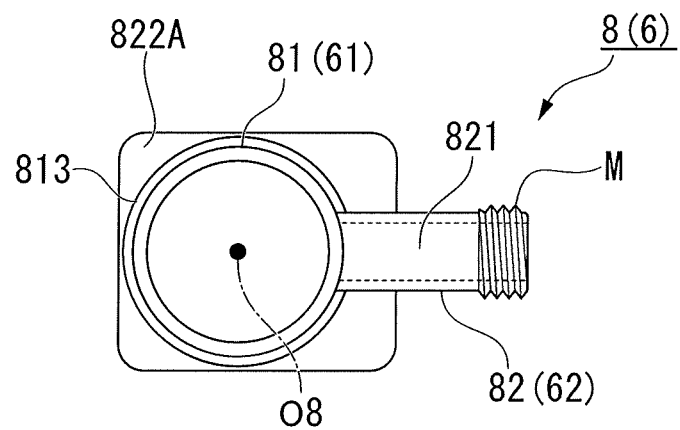
FIG. 13 is a side view illustrating the intermediate cylinder body of another embodiment of the invention as viewed from an extension direction of an intermediate center axis.

For example, a part of the reinforcement portion may have a shape different from that of the other reinforcement portion or as illustrated in FIGS. 12 and 13, a reinforcement portion (for example, an intermediate reinforcement portion 822A) of the connection portion body located at the sliding area (including the connection portion body partially located at the sliding area) may be disposed in the entire outer periphery in the circumferential direction along the outer periphery of the cylinder body. Here, a state where the reinforcement portion is disposed in the entire outer periphery in the circumferential direction indicates a state where the reinforcement portion is disposed in a range of 80% or more of the length of the entire outer periphery in the circumferential direction. That is, as illustrated in FIGS. 12 and 13, even when a part of the reinforcement portion is formed at the same height as that of the outer peripheral surface of the cylinder body and a part of the reinforcement portion is interrupted, the reinforcement portion may be disposed in a range of 80% or more in the length of the entire outer periphery in the circumferential direction.

In the first embodiment and the second embodiment, all of the connection portions 62 such as the first end connection portion 72, the intermediate connection portion 82, and the second end connection portion 92 have the same shape, but the connection portions 62 are not limited to such a shape. The connection portions 62 may respectively have different shapes in response to the cylinder portion 6 to be installed.

Further, only the second end cylinder portion 9 is provided with the water intake portion 63 in the first embodiment and only the water intake cylinder portion 90 is provided with the water intake portion 63 in the second embodiment. However, the invention is not limited to a structure in which only one cylinder portion 6 includes the water intake portion 63. For example, in the water collection header 5 of the first embodiment, since the first end cylinder portion 7 or the intermediate cylinder portion 8 is provided with the water intake portion 63, one water collection header 5 may be provided with the water intake portions 63. Further, in the water collection header 5A of the second embodiment, since the end cylinder portion 70 is provided with the water intake portion 63A, one water collection header 5A may be provided with the water intake portions 63A.

Further, the invention is not limited to a structure in which all cylinder portions 6 are provided with the connection portions 62 as in the first end cylinder portion 7, the intermediate cylinder portion 8, and the second end cylinder portion 9 of the first embodiment. For example, the first end cylinder portion 7 or the second end cylinder portion 9 may not be provided with the connection portion 62.

Further, in the embodiment, only the first end portion 8a of the intermediate cylinder body 81 is provided with the intermediate expanded area 813, but the invention is not limited to such a structure. Similarly, only the first end portion 9a of the second end cylinder body 91 is provided with the second enlarged area 913, but the invention is not limited to such a structure. Thus, for example, the second end portion 8b of the intermediate cylinder body 81 or the second end portion 9b of the second end cylinder body 91 may be provided with an enlarged area which corresponds to the intermediate expanded area 813 or the second enlarged area 913 and has an inner peripheral surface formed to be slidable on an outer peripheral surface of an adjacent member.

Further, the invention is not limited to a structure in which the adjacent cylinder portions 6 are simply connected to each other by fitting. Thus, the adjacent cylinder portions 6 may be more strongly connected to each other by welding a portion between the cylinder portions 6.

<Water Treatment Method>

In a water treatment method of the invention, water is treated by using the water collection header, the membrane module connected to the connection portion of the water collection header, and the membrane module unit having the frame portion equipped with the water collection header and the membrane module of the invention. An existing method can be employed except that the membrane module unit of the invention is used.

EXPLANATIONS OF LETTERS OR NUMERALS 1 membrane module unit
2 frame portion 2T vertical frame
2Y horizontal frame
2P plate material
3 diffusing pipe
4 membrane module
41 hollow fiber membrane sheet
42 housing
43 water intake port
5, 5A water collection header
6 cylinder portion
61 cylinder body
62 connection portion
63, 63A water intake portion
O center axis
7 first end cylinder portion
71 first end cylinder body
711 first concave portion
712 first penetration hole
O7 first center axis
72 first end connection portion
721 first end connection portion body
722 first end reinforcement portion
M screw structure
8 intermediate cylinder portion
81 intermediate cylinder body
811 intermediate concave portion
812 intermediate penetration hole
813 intermediate expanded area
O8 intermediate center axis
82 intermediate connection portion
821 intermediate connection portion body
822, 822A intermediate reinforcement portion
9 second end cylinder portion
91 second end cylinder body
911 second concave portion
912 second penetration hole
913 second enlarged area
O9 second center axis
92 second end connection portion
921 second end connection portion body
922 second end reinforcement portion
10 merging pipe
80 second intermediate cylinder portion
810 second intermediate cylinder body
70 end cylinder portion
71A end cylinder body
90 water intake cylinder portion
91A water intake cylinder body

The invention claimed is:

1. A water collection header for collecting and extracting filtrate from a plurality of membrane modules, comprising:
a plurality of cylinder portions each including a cylinder body formed in a cylindrical shape in which at least one end portion is opened and formed such that the end portions are sequentially connected to each other in a water-tight state,
wherein at least one cylinder portion of the plurality of cylinder portions includes a connection portion connected to the membrane module so that the filtrate flows from the membrane module,
wherein at least one cylinder portion of the plurality of cylinder portions includes a water intake portion capable of discharging the filtrate inside the cylinder body to the outside,
wherein an outer peripheral surface of a sliding area of the end portion of the cylinder body slides on an inner peripheral surface of a sliding area of the end portion of another adjacent cylinder body so that the cylinder body is connected to another adjacent cylinder body,
wherein at least one penetration hole is formed in the sliding area of the cylinder body having the outer peripheral surface of the end portion sliding on the inner peripheral surface of the end portion of another adjacent cylinder body, and
wherein the penetration hole communicates with the connection portion of the another adjacent cylinder body.

2. The water collection header according to claim 1, wherein a positioning mechanism is provided in the inner peripheral surface of the cylinder body having the inner peripheral surface of the end portion sliding on the outer peripheral surface of the end portion of another adjacent cylinder body.

3. The water collection header according to claim 2, wherein the positioning mechanism is a convex portion protruding inward from the inner peripheral surface.

4. The water collection header according to claim 1, wherein a length of the sliding area in a longitudinal direction of the cylinder body is 60% or more of an inner diameter of an outermost portion of the inner peripheral surface of the cylinder body having the inner peripheral surface of the end portion sliding on the outer peripheral surface of the end portion of another adjacent cylinder body.

5. The water collection header according to claim 1, wherein the connection portion includes a connection portion body formed in a cylindrical shape and extending from the outer peripheral surface of the cylinder body.

6. The water collection header according to claim 5, wherein the connection portion body has a screw structure provided with a spiral uneven portion formed in an outer peripheral surface of a front end portion opposite to a connection side to the cylinder body of the connection portion body.

7. The water collection header according to claim 5, wherein the connection portion body includes a reinforcement portion formed at the connection side to the cylinder body of the connection portion body to connect the outer peripheral surface of the connection portion body to the outer peripheral surface of the cylinder body.

8. The water collection header according to claim 7, wherein the reinforcement portion of the connection portion body located in the sliding area is disposed in an entire outer periphery of the cylinder body in the circumferential direction along the outer periphery.

9. The water collection header according to claim 1, wherein the water collection header is a resin molded member formed of a resin material.

10. A membrane module unit comprising:
the water collection header according to claim 1;
a membrane module connected to the connection portion; and
a frame portion equipped with the water collection header and the membrane module.

11. A water treatment method using the membrane module unit according to claim 10.

* * * * *

UNITED STATES PATENT AND TRADEMARK OFFICE
CERTIFICATE OF CORRECTION

PATENT NO. : 10,112,147 B2
APPLICATION NO. : 15/997739
DATED : October 30, 2018
INVENTOR(S) : Katsuyuki Yanone et al.

It is certified that error appears in the above-identified patent and that said Letters Patent is hereby corrected as shown below:

On the Title Page

Item (30), the Foreign Application Priority Data has been omitted. Item (30) should read:
--(30)  Foreign Application Priority Data
Jan. 21, 2016    (JP)..................2016-010087--

Signed and Sealed this
Fourteenth Day of May, 2019

Andrei Iancu
*Director of the United States Patent and Trademark Office*